Jan. 16, 1934.  J. BUTTACI ET AL  1,943,754
WELDING ROD HOLDER
Original Filed Jan. 20, 1931  2 Sheets-Sheet 1
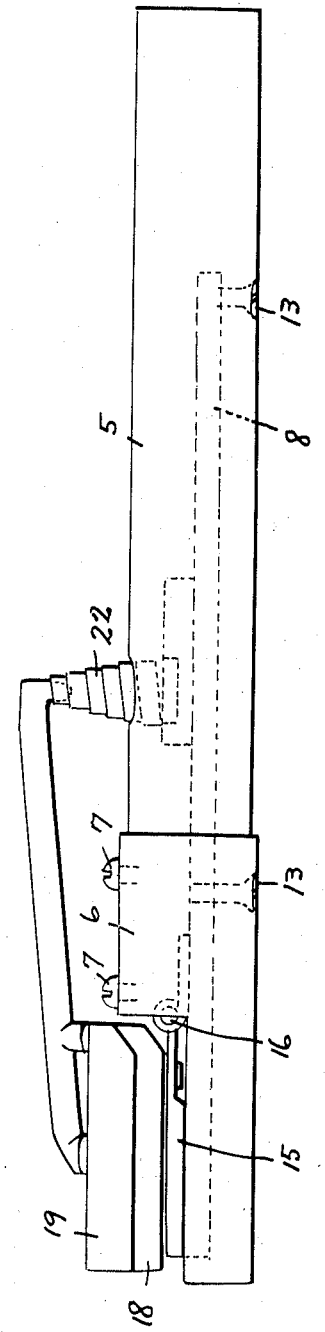
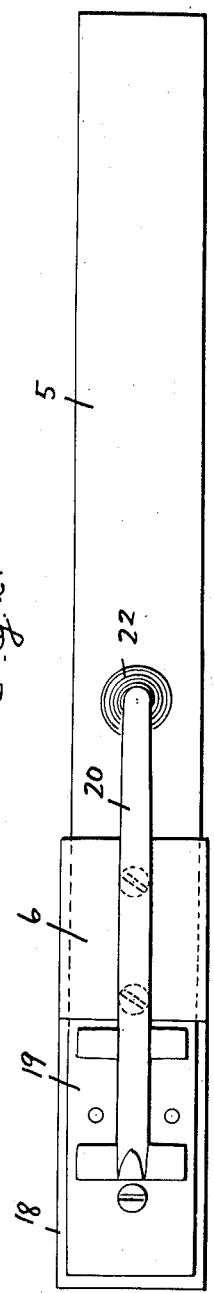
Inventors
Joseph Buttaci
Joseph J. Goers
By Clarence A. O'Brien
Attorney

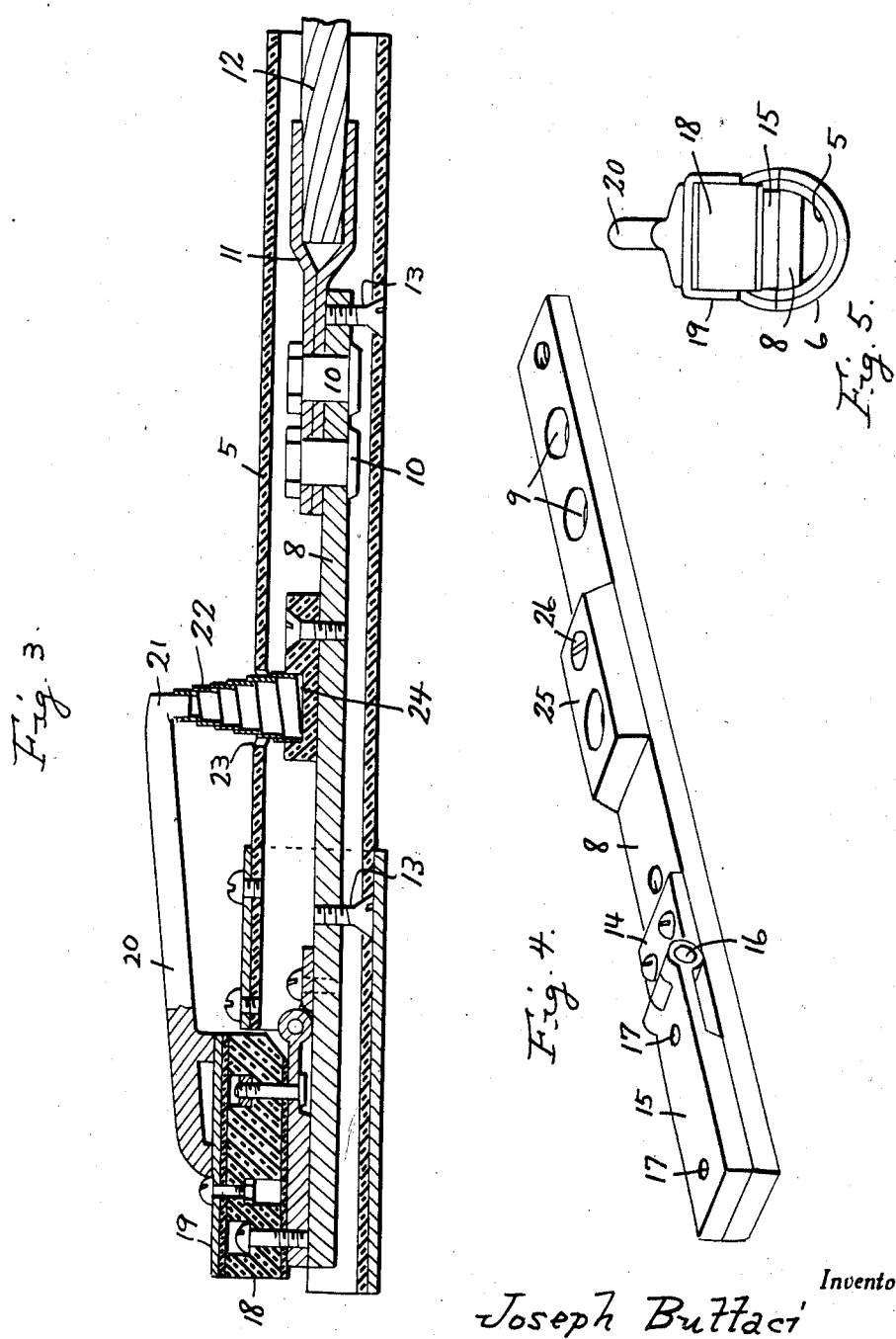

Patented Jan. 16, 1934

1,943,754

UNITED STATES PATENT OFFICE 1,943,754

WELDING ROD HOLDER

Joseph Buttaci, Corona, and Joseph J. Goers, New Dorp, Staten Island, N. Y.

Application January 20, 1931, Serial No. 510,047
Renewed July 24, 1933

2 Claims. (Cl. 219—8)

This invention appertains to improvements in holders for welding rods.

The principal object of this invention is to provide a welding rod holder constructed in such a manner as to make the possibility of arcing between the handle thereof and ground practically negligible.

During the course of the following specification and claims other important objects and advantages of the invention will readily become apparent to the reader.

In the drawings:—

Figure 1 represents a side elevational view of the implement.

Fig. 2 represents a top plan view of the device.

Fig. 3 represents a longitudinal sectional view through the implement.

Fig. 4 is a perspective view of the conductor bar of the implement.

Fig. 5 represents a front end elevational view of the device.

Referring to the drawings wherein like numerals designate like parts, it can be seen that the handle is denoted by numeral 5 and is constructed tubular and of some suitable di-electric material. One end portion of this handle 5 is reduced to conform with the cut-out portion of the sleeve 6 which engages over one end of the handle 5 and which is secured thereto by suitable elements 7.

A conductor bar, which is generally referred to by numeral 8 is of some suitable current conductive material and is provided with openings 9 at one end through which elements 10 can be disposed for securing the connector 11 to the said bar 8, the said connector 11 being of the socket type for receiving the end of the current supply conductor 12.

As is clearly shown in Fig. 3, screws 13 are disposed through the wall of the handle 5 and engage into the bar 8 for maintaining the bar supported within the handle, and in spaced relation to the said handle. A plate 14 hingedly connects the jaw plates 15 to the bar 8 as at 16, and this jaw plate 15 is provided with openings 17 to accommodate securing means whereby the di-electric blocks 18 can be secured thereto.

Secured to the outer side of the block 18 is the plate 19 from which extends obliquely, the shank 20, which is provided with a downwardly disposed upper end portion 21 for disposition within the conically spiral spring 22, extending through the openings 23 in the handle 5 and being seated within the socket 24 of the di-electric plate 25, the same being secured to the aforementioned bar 8 by the screw 26.

It can now be seen that by pressing downwardly on the shank 20, at the spring supported thereof, the jaw plate 15 will be swung outwardly, so that a welding rod can be inserted between the jaw plate 15 and the opposite end of the bar 8. By releasing the shank 20, the tension of the spring 22 will return the jaw plate 15 so that the welding rod will be retained firmly in place between the same and the bar 8.

It will be observed, that there is practically no way in which current can pass thru the handle to ground. Furthermore, while the foregoing specification sets forth the invention in specific terms, it is to be understood that numerous changes in the shape, size and materials may be resorted to without departing from the spirit and scope of the invention as claimed hereinafter.

Having thus described our invention, what we claim as new is:—

1. A welding rod holder comprising a hollow insulating handle, a conductor bar projecting longitudinally in the handle and terminating at its ends therein, said handle being provided with a slot at one end thereof, a jaw swingably mounted on the conductor bar at the end adjacent the slot in the handle, a shank on the jaw operative through the handle slot, and a spring impinged against the outer end of the shank normally tensioning the jaw against the bar.

2. A welding rod holder comprising a hollow insulating handle, a conductor bar projecting longitudinally in the handle and terminating at its ends therein, said handle being provided with a slot at one end thereof, a jaw swingably mounted on the conductor bar at the end adjacent the slot in the handle, a shank on the jaw operative through the handle slot, a spring impinged against the outer end of the shank normally tensioning the jaw against the bar, said handle being provided with an opening therein, said spring projecting through the opening, and an insulating block on the conductor bar, against which the inner end of the spring hinges.

JOSEPH BUTTACI.
JOSEPH J. GOERS.